Patented Apr. 25, 1939

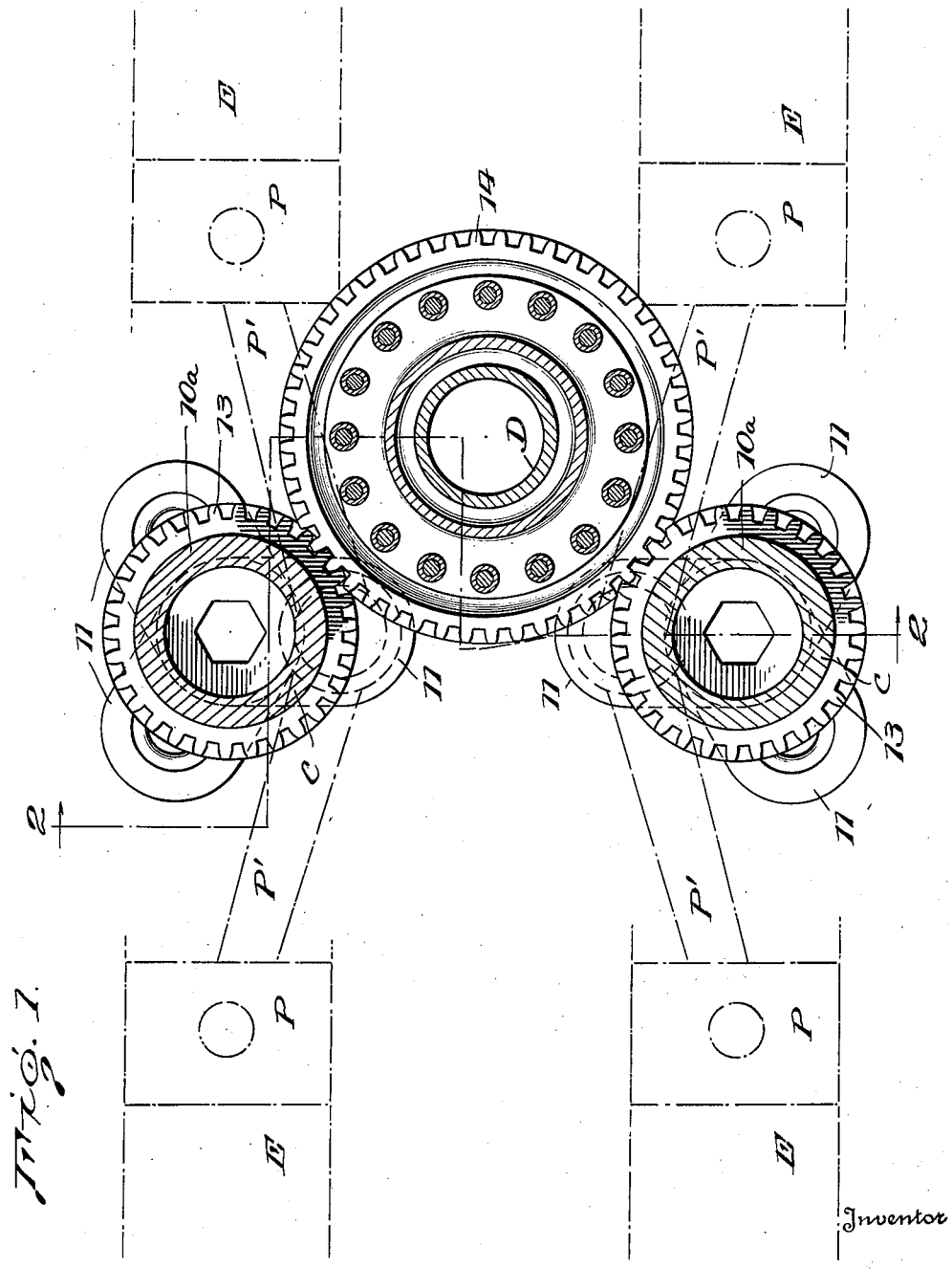

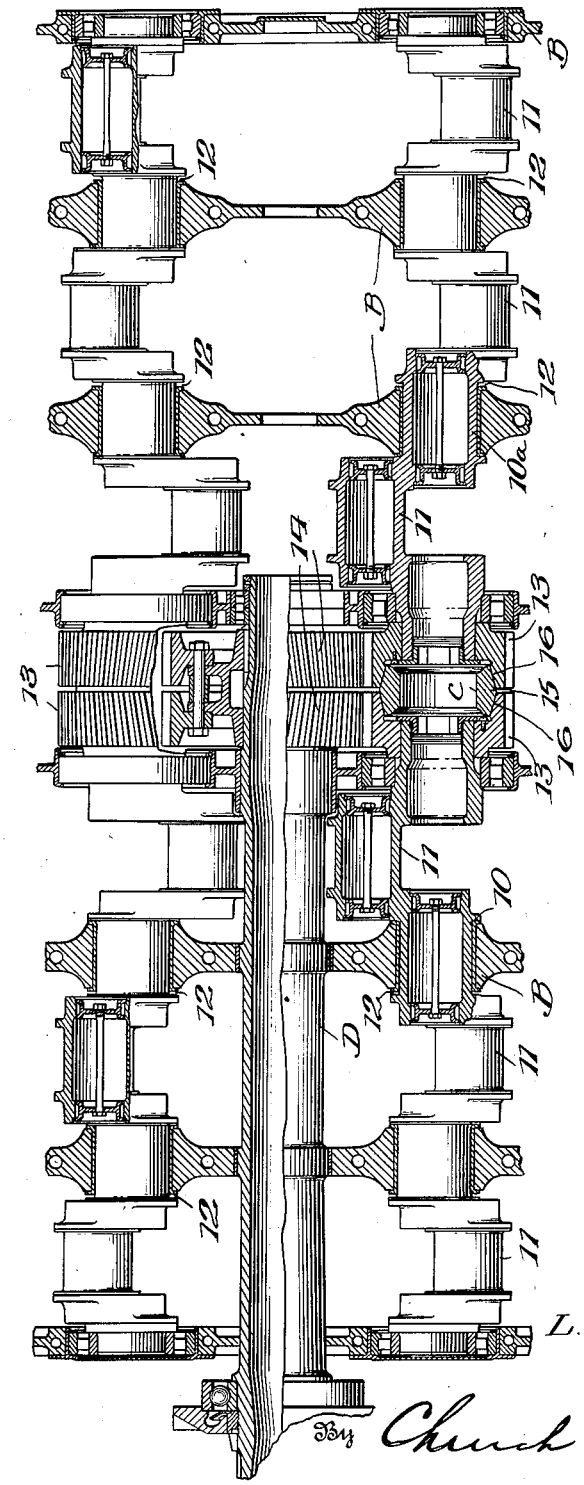

2,156,203

UNITED STATES PATENT OFFICE 2,156,203

MULTICYLINDER ENGINE

Louis R. Spencer, West Hartford, Conn., assignor to Spencer Aircraft Motors, Inc., Hartford, Conn., a corporation of Connecticut Application January 27, 1938, Serial No. 187,295

12 Claims. (Cl. 74—389)

This invention relates to improvements in multi-cylinder engine or motor assemblies and particularly to the construction or formation of the crank shaft for said engines.

One object of the invention is to provide an engine assembly wherein the number of cylinders will not be limited by the stresses which are normally factors in determining the size, construction or formation of the crank shaft. More specifically, the invention contemplates a crank shaft construction which will permit the use of any desired number of cylinders in connection therewith, without imposing excessive torsional or "wind-up" strains thereon.

A further object is to provide a sectional crank shaft, each section having a plurality of cylinders associated therewith and means for releasably locking the sections together whereby the several sections function as a unitary mass, thus combining the inertia of the otherwise independent sections.

A still further object of the invention is to provide means, operable by thrusts on the crank shaft, for locking the shaft sections together.

A still further object is to provide a crank shaft assembly which will permit the use of relatively narrow gears for transmitting motion to the shaft driven from the crank shaft.

Another object is to connect the crank shaft sections together by means which will compensate for variations in the location of the crank shaft gears circumferentially of the individual shaft sections.

With these and other objects in view, the invention consists in certain details of construction and combinations and arrangements of parts, all as will hereinafter be more fully described and the features of novelty particularly pointed out in the appended claims.

In the accompanying drawings,

Figure 1 is a vertical sectional view transversely of a driven shaft and two crank shafts, certain of the cylinders, pistons and connecting rods of an assembly being indicated in dotted lines, this assembly being of the type referred to as an H-engine; and Fig. 2 is a sectional view on the line 2—2 of Fig. 1.

With the H-type engine illustrated in the present instance, the cylinders E are arranged in rows at opposite sides of and above and below the driven shaft D, usually the propeller shaft. As will be apparent from the ensuing description, the number of cylinders in each row longitudinally of the shaft is variable with the length of the crank shafts C, of which there are two in the present construction. The pistons P of the several cylinders are connected by connecting rods P' to the respective cranks of the crank shafts, the cranks being offset circumferentially of their shafts to minimize vibration.

The construction and assembly of the crank shafts being duplicates of each other, only one need be described in detail. Referring particularly to Fig. 2, each crank shaft is of sectional formation, there being two sections 10, 10ª in each shaft in the present instance and each section is provided with a plurality of cranks 11 to which the several connecting rods P' are attached. The crank shafts in the present illustration each accommodate twelve (12) cylinders, six cylinders being associated with each crank shaft section.

Each crank shaft section is journaled in suitable bearings B but it will be noted that a slight clearance is provided, for instance as indicated at 12, whereby thrusts on the sections can impart a limited axial or longitudinal movement thereto. At their juxtaposed ends each crank shaft section is provided with a gear 13, the two gears of each shaft being formed with teeth of reverse pressure angles, the two gears jointly forming what is commonly referred to as a "herring-bone" gear. The gears 13 of the crank shaft mesh with similarly formed gears 14 on the driven or propeller shaft and, as will be apparent, rotary motion of the crank shaft sections will cause them to be subjected to thrusts by reason of the inclination of the teeth of the several gears.

The longitudinal movement of the crank shaft sections toward each other effected by these thrust strains is utilized for locking the sections of each shaft together in a substantially unitary mass. For instance, interposed between the juxtaposed ends of each two contiguous sections there is a locking member which is engaged by the shaft sections with sufficient force or pressure to lock said sections together through said member. Preferably, this locking member is in the form of a ring 15 whose peripheral surface is tapered in opposite directions axially of the ring to form inclined surfaces which engage with a wedging action on tapering surfaces 16 carried by the crank shaft sections. In the present instance these tapering surfaces 16 are the walls of sockets or recesses formed by the interiors of gear wheels 13, said recesses gradually decreasing in cross-section inwardly of the gears to form said tapering surfaces. With a construction of this nature, the movement of the two shaft sections toward each other will cause them to jam or frictionally lock on the ring 15, whereupon both sections, together with the ring and gears 13, will operate or rotate as a unitary mass. Another advantage of this friction lock is the added support given the driving gears when under heavy load.

Preferably, the locking member 15 is circular, as shown, because this form will permit the shaft sections to slip circumferentially thereon and compensate for any variation that may temporarily exist in the location of the crank shaft gears with respect to each other circumferentially of their shafts. This construction also permits the use of relatively narrow gears which gives a better distribution of the load on said gears. In this connection, it might be mentioned that it has been found impracticable to use gears of wide dimensions for reduction gearing due to the difficulty of obtaining even load distribution in a wide gear.

The provision of sectional crank shafts with means for releasably locking the same in a substantially unitary mass greatly reduces the torsional strain or "wind up" on the shaft sections, due to the short distance of power transfer in transmitting rotary motion to the driven or propeller shaft. Another advantage of this construction is the fact that much lighter crank shafts are entirely feasible.

What is claimed is:

1. The combination of a driven shaft, a gear on said shaft, a sectional crank shaft disposed longitudinally of the driven shaft, gear members on said crank shaft sections meshing with the driven shaft gear, and means releasably locking said crank shaft sections rigidly together, the gear members of the crank shaft being movable axially of the driven shaft for rendering said locking means operative.

2. The combination of a driven shaft, a gear on said shaft, a crank shaft composed of a plurality of sections arranged end to end parallel to said driven shaft, gears on juxtaposed ends of contiguous crank shaft sections meshing with the gears on said driven shaft, and means frictionally and releasably locking juxtaposed crank shaft sections together, said locking means being rendered operative by an axial movement of said crank shaft gears.

3. The combination of a driven shaft, a gear on said shaft, a crank shaft arranged parallel to said driven shaft, said crank shaft being composed of two sections disposed end to end, gears on the juxtaposed ends of said sections meshing with the gear on said driven shaft, said shaft sections having a limited axial movement, a coupling member and wedge-shaped surfaces on said member engageable with the juxtaposed ends of said shaft sections upon axial movement of the latter toward each other to releasably lock said sections together.

4. The combination of a driven shaft, a crank shaft disposed parallel thereto, said crank shaft being composed of a plurality of sections, intermeshing gears on said driven shaft and crank shaft sections, said crank shaft sections having axially extending recesses of tapering cross-section at their juxtaposed ends, and a locking member having tapering surfaces engageable in said recesses for locking said shaft sections together, the gears on the crank shaft sections being capable of moving axially of the driven shaft to effect locking engagement of said tapering recesses and locking member.

5. The combination of a driven shaft, gear elements on said shaft, a crank shaft disposed parallel to said driven shaft and formed of a plurality of sections, gears on the contiguous ends of said crank shaft sections meshing with but movable axially of the driven shaft gears, and means engageable with the crank shaft gears upon axial movement of the latter for locking the crank shaft sections together.

6. The combination of a driven shaft, a pair of gears of reverse pressure angle mounted on said shaft, a sectional crank shaft disposed parallel to said driven shaft, gears on said crank shaft sections meshing with the gears on the driven shaft, said crank shaft sections and their gears having a limited axial movement relatively to the driven shaft, and means for releasably locking said crank shaft sections together upon axial movement of said sections together with their gears toward each other.

7. The combination of a driven shaft, a pair of gears of reverse pressure angle mounted on said shaft, a sectional crank shaft disposed parallel to said driven shaft, gears on said crank shaft sections meshing with the gears on the driven shaft, said crank shaft sections and their respective gears having a limited axial movement relatively to the driven shaft, and means for releasably locking said crank shaft sections together, said means comprising a ring having its peripheral surface tapered laterally in opposite directions and engageable with correspondingly tapered surfaces carried by the crank shaft sections when the latter are moved axially toward each other.

8. The combination of a driven shaft, a pair of gears thereon, a sectional crank shaft arranged parallel to said driven shaft, a gear mounted on each of said sections meshing with the driven shaft gear, said crank shaft sections and their respective gears being movable axially toward and from each other, a double cone ring interposed between the crank shaft sections, and conical surfaces carried by said crank shaft sections movable into wedging engagement with said ring by axial movement of the sections toward each other.

9. The combination of a driven shaft, a crank shafts at opposite sides of said driven shaft, each crank shaft comprising two sections, intermeshing gears on said driven shaft and said crank shaft sections, the teeth of said gears being disposed diagonally of the axes of the gears whereby a longitudinal thrust is imposed on the shafts upon rotation of the gears, means operable by the longitudinal thrust of the shafts for releasably locking the sections of each crank shaft together, a plurality of cranks on each crank shaft section, an internal combustion engine cylinder for each crank, and pistons in said cylinders connected to said cranks, the cylinders for each crank shaft being disposed longitudinal of the driven shaft.

10. The combination of a driven shaft, a gear on said shaft, a sectional crank shaft disposed longitudinally of the driven shaft, intermeshing gears on said driven shaft and crank shaft sections, the teeth of said gears being disposed diagonally of the axes of said shafts whereby axial thrust is imposed on said gears during rotation thereof, and said crank shaft gears being free to move axially under said thrust, and means for locking said crank shaft sections together, said means being rendered operable by axial movement of the crank shaft gears only during rotation of said shafts.

11. The combination of a driven shaft, a gear on said shaft, a sectional crank shaft disposed longitudinally of the driven shaft, intermeshing gears on said driven shaft and crank shaft sections, the teeth of said gears being disposed diagonally of the axes of said shafts, whereby axial thrust is imposed on said gears during rotation thereof, and said crank shaft gear being free to move axially under said thrust, and locking means engageable with said gears with a wedging action only upon axial movement of the latter for locking the crank shaft sections together.

12. The combination of a driven shaft, a gear on said shaft, a sectional crank shaft disposed longitudinally of the driven shaft, intermeshing gears on said driven shaft and crank shaft sections, the gears on said crank shaft sections being movable axially, and a locking member enclosed within said gears but disengaged therefrom except during rotation of the gears, said gears being movable axially during rotation thereof into wedging engagement with said locking member to lock the crank shaft sections together

LOUIS R. SPENCER.